(12) United States Patent
Mäkelä

(10) Patent No.: US 7,191,060 B2
(45) Date of Patent: *Mar. 13, 2007

(54) METHOD FOR AUTOMATICALLY GUIDING A MINING MACHINE

(75) Inventor: Hannu Mäkelä, Helsinki (FI)

(73) Assignee: Sandvik Tamrock Oy, Tampere (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/232,262

(22) Filed: Sep. 22, 2005

(65) Prior Publication Data

US 2006/0069471 A1 Mar. 30, 2006

Related U.S. Application Data

(63) Continuation of application No. PCT/FI04/00170, filed on Mar. 25, 2004.

(30) Foreign Application Priority Data

Mar. 25, 2003 (FI) .................. 20030444

(51) Int. Cl.
*G01C 21/30* (2006.01)

(52) U.S. Cl. .................. 701/209; 701/23; 701/50; 701/201; 701/214; 701/300

(58) Field of Classification Search .................. 701/50, 701/71, 23, 202, 301, 209, 201, 213, 214, 701/300; 180/167; 318/587
See application file for complete search history.

(56) References Cited

U.S. PATENT DOCUMENTS

| | | | | |
|---|---|---|---|---|
| 5,031,103 | A | * 7/1991 | Kamimura et al. | ......... 701/207 |
| 5,079,706 | A | * 1/1992 | Yamaguchi et al. | .......... 701/23 |
| 5,170,352 | A | 12/1992 | McTamaney et al. | ....... 364/424 |
| 5,572,428 | A | 11/1996 | Ishida et al. | ................. 364/461 |
| 5,615,116 | A | 3/1997 | Gudat et al. | ................. 364/423 |
| 5,923,270 | A | 7/1999 | Sampo et al. | ............... 340/988 |
| 5,956,250 | A | 9/1999 | Gudat et al. | ................. 364/424 |
| 5,999,865 | A | 12/1999 | Bloomquist et al. | .......... 701/25 |
| 6,044,312 | A | 3/2000 | Sudo et al. | .................... 701/25 |
| 6,195,610 | B1 | 2/2001 | Kaneko | ...................... 701/200 |
| 6,304,818 | B1 | 10/2001 | Kamiya | ...................... 701/200 |
| 2006/0069472 | A1 * | 3/2006 | Makela | ........................ 701/23 |

FOREIGN PATENT DOCUMENTS

| | | |
|---|---|---|
| EP | 0 901 056 | 3/1999 |
| EP | 1 176 393 | 1/2002 |
| FI | 964 528 | 11/1996 |
| JP | 8123547 | 5/1996 |
| JP | 2001-060112 | 3/2001 |
| WO | 02/30792 | 4/2002 |

* cited by examiner

*Primary Examiner*—Gertrude A. Jeanglaude
(74) *Attorney, Agent, or Firm*—Drinker Biddle & Reath LLP

(57) ABSTRACT

A method for automatically guiding a mining machine (14) provided with a route determined as successive route determined as successive route points in the mine. In the method, data relating to the successive points are used for determining additional route between the successive route points for guiding the mining machine (14).

8 Claims, 5 Drawing Sheets

Information Ii possibly included in point $P_i$:
direction $x_i$
direction $y_i$
turning angle $\omega$
speed: $v_i$ e.g. 10 km/h
gear:    e.g. 2
boom:    e.g. 30°
bucket:  e.g. horizontal

METHOD FOR AUTOMATICALLY GUIDING A MINING MACHINE

This application is a Continuation patent application under 37 C.F.R. § 1.53(b), of pending prior PCT International application no. PCT/FI2004/000170, having a filing date of Mar. 25, 2004.

BACKGROUND OF THE INVENTION

The invention relates to a method for automatically guiding a mining machine, in which method a route needed by a mining machine is determined for the machine as successive route points in a coordinate system fixed in relation to the mine and in which the location of the mining machine on the route is determined using at least one positioning device provided in the mining machine.

When mining machines, particularly unmanned ones, are used, it is necessary that they can be guided along a specific route reliably and safely. A problem encountered here is that the route should be determined with sufficient precision. A further problem is that as the operation continues and situations change, it must be possible to re-determine the routes of the vehicle in a precise and reliable manner.

It is known per se to use different systems and methods to guide mining machines to travel automatically, without a driver. Such prior art solutions employ either control cables embedded in the underlying surface or separate control signs or location detectors, which can be used for wired or wireless control of the position and movement of the vehicles. It is also known to use a wireless control system based on satellite navigation for controlling an automatically moving vehicle.

The use of solutions based on control cables is problematic in mines because the laying of control cables to mining tunnel floors is extremely expensive and the rubble carried in mines may damage the cables as vehicles cross the cable lines. Further, it is not conceivable to lay cables to new, continuously extending mining areas. As regards systems based on satellite positioning, they do not function in mines and are therefore inapplicable there.

BRIEF DESCRIPTION OF THE INVENTION

It is an object of the invention to provide a method allowing a route of a mining machine and the operation of the machine at different points on the route to be determined in a flexible and reliable manner. The method of the invention is characterized in that on the basis of information relating to the route points already determined in the coordinate system, additional points are determined between the successive route points for guiding the mining machine, each additional point being provided at least with location coordinates determined on the basis of the coordinate values of the already determined points located on both sides thereof.

A basic idea of the invention is that the routes needed by unmanned and/or automatically operating mining machines for accomplishing their tasks are determined as route points located at suitable intervals, each route point being provided with limit values for driving speeds and other operations, for example, determined according to need. Such variables may even be determined mining-machine-specifically, taking into account the characteristics of each mining machine. To guide a mining machine to travel from one particular location to another and, correspondingly, to carry out a specific task, the control system of the mine sends the mining machine a list of the route points and their characteristics, one of the route points being closest to the current location of the machine. Further, information indicating the end point of the route is given. The route point data are preferably given as interconnected route portions, or segments, each of which is provided with a specific identifier code. The stored segment-specific identifier data include the route points of the segment, with the associated location data, and any point-specific control data, such as direction, speed, actuator positions, etc. In accordance with the invention, additional points are determined between the already determined route points to provide more accurate guidance of the machine, a location of an additional point being determined by using the coordinate data relating to the already determined route or additional points on both sides of the point to be determined. If, in addition to location determined in relation to the coordinate system, some parameters have been determined in the route points, corresponding parameters can be determined for an additional point, using the parameters determined for route or additional points located on both sides of the additional point in question.

An advantage of the invention is that it provides a simple and convenient means for assigning tasks to a mining machine operating unmanned and/or automatically according to control commands and for providing it with the necessary route data. A further advantage is that by using approximation of new points on portions between route points, the number of points to be stored and thus the total amount of data to be stored in relation to the route points does not become too high.

BRIEF DESCRIPTION OF THE DRAWINGS

The invention will be disclosed in greater detail in connection with the following drawings, in which.

For the sake clarity the invention shown in the Figures has been simplified. Like parts are indicated with like reference numerals.

DETAILED DESCRIPTION OF THE INVENTION

Figure 1:
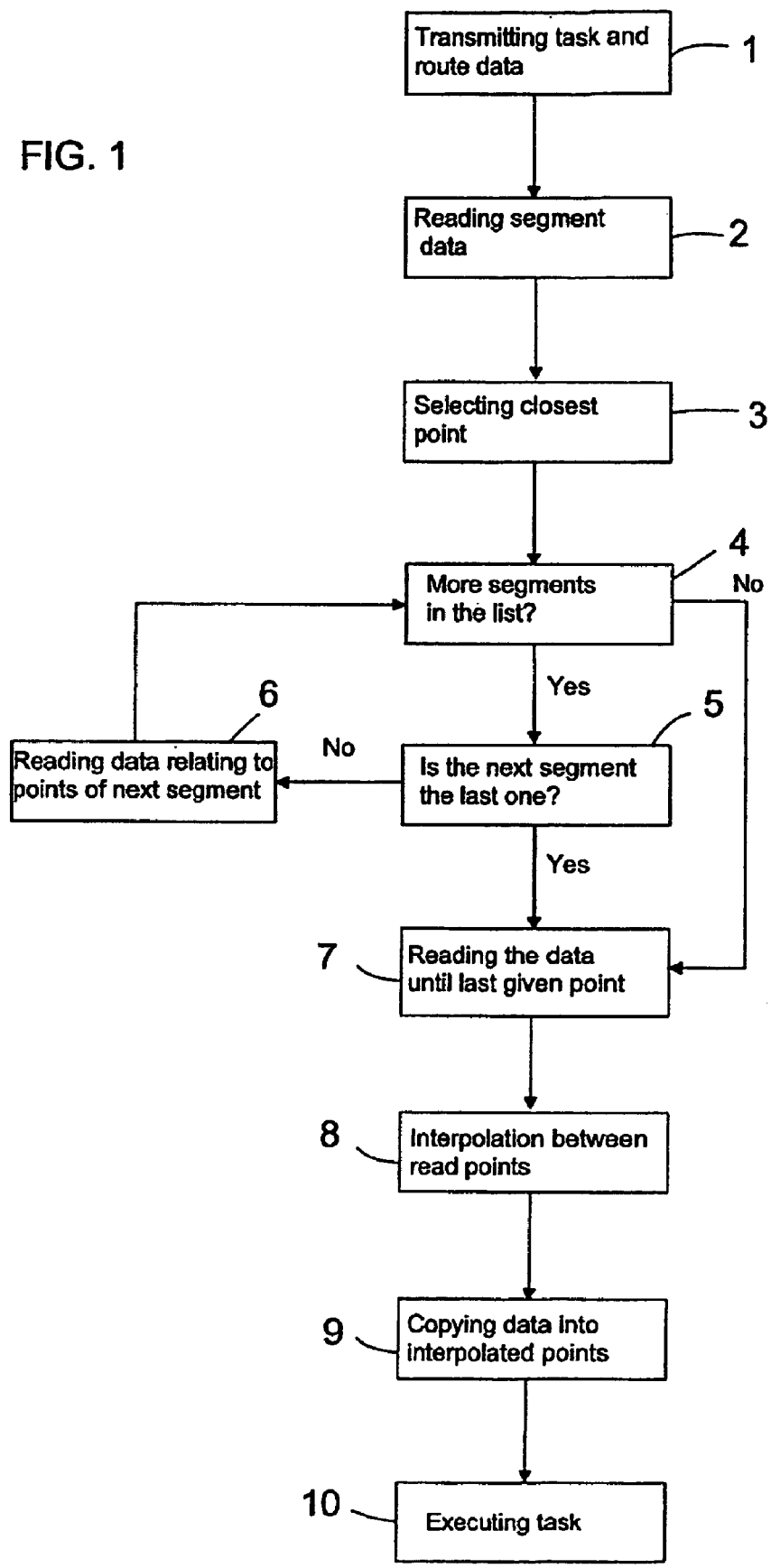
FIG. 1 is a schematic flow diagram illustrating a method of the invention.

FIG. 1 is a schematic flow diagram illustrating a method of the invention for controlling an automatically moving, preferably unmanned mining machine. First a control system sends a route specification relating to a new task to the machine, the specification including, by way of example, the identifier data of the route segments, with the associated variables determined for them, such as maximum allowed speed, etc. However, the invention is not restricted to segment-based solutions, but the route can be determined simply as route points, without separately determining segments. In this example, however, a segment-based solution is used, the data of the segments being transmitted from the control system of the mine to the control equipment of the mining machine in step 1 of the flow diagram. In step 2 the control system of the mining machine stores in its memory the route segment data received in the message from the control system of the mine. In step 3 the mining machine starts to execute its task at its current location by searching the route file provided by the control system for the closest starting point of a segment belonging to the route. In step 4 the control system of the mining machine checks whether the message sent by the control system of the mine contains more segment data. If the data stored in the memory has another segment, in continuation of the starting segment, the control system of the mining machine checks in step 5 whether the segment is the last one of the segments received in the message. If it is not, which is most often the case, the control system of the machine reads in step 6 the points and the associated data determining the segment in question. The routine then returns to step 4 of the flow diagram to check whether there are more segments in the list. The routine is repeated through steps 5 and 6 back to step 4 until there are no segments left in the list. If it is detected in step 5 that the next segment is the last one, or in step 4 that there are no more segments in the list, the routine proceeds to step 7, i.e. the points in the route specification of the last segment and the associated data are read until the indicated end point is reached. Next, to provide the mining machine with driving specifications at more frequent intervals than allowed by the route points stored in the memory, additional points are formed between the points by interpolation in step 8. In step 9 the data determining the additional points are specified by using the coordinate values and eventual parameter values obtained from the original route points or the already determined additional points to provide the additional points with coordinate values and any parameter values that may be needed.

The route relating to the mining machine's task being thus determined, the mining machine, guided by its own control equipment, travels along the route as determined in the task, either from its point of departure to the end point or continuously on the assigned route, either back and forth or in one direction on a closed route, for example. Since the segments are in practice determined in relatively real-time, it is possible that when the first point has been determined the mining machine starts off to its route to accomplish its task, forming, at the same time as it moves, the route using the parameters in its memory.

Figure 2:
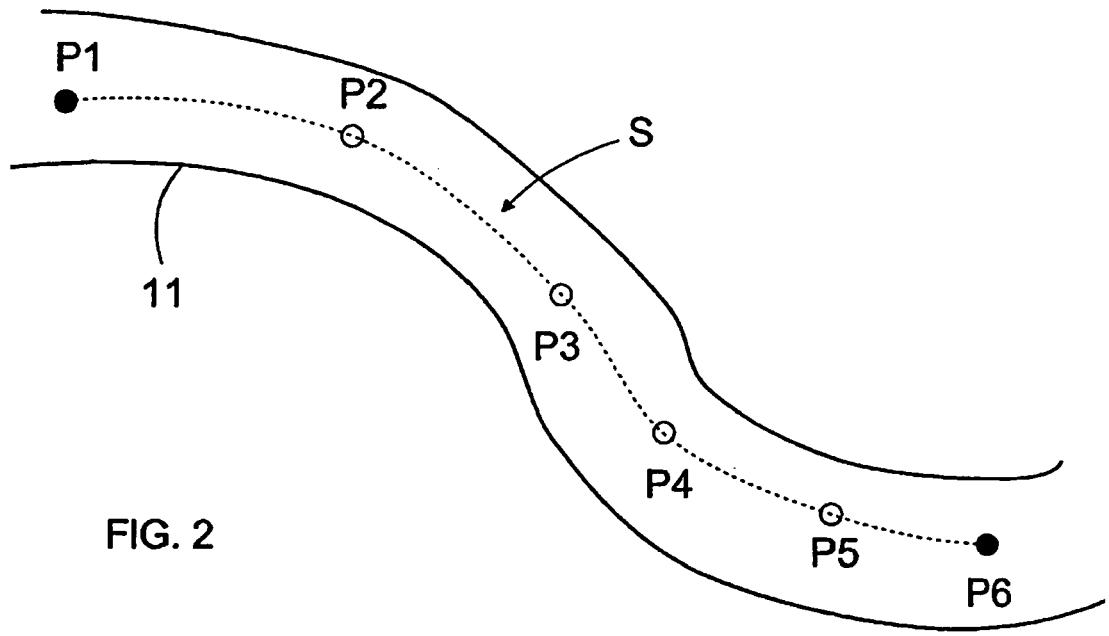
FIG. 2 is a schematic illustration of a route segment and the associated control points.

FIG. 2 is a schematic illustration of a structure of a segment. Segment S has six points, by way of example, of which points P1 and P6 are the end points of segment S. Each one of these points is provided with a location determined in a coordinate system, i.e. perpendicular directions x and y determined in a specific coordinate system fixed in relation to the earth. In the simples case the segment is determined only by route point position in the coordinate system, the control equipment of the mining machine calculating the direction between the points on the basis of the coordinate values of the points alone. In addition, different point-specific parameters can be determined to ensure safe and reliable movement. It is thus possible to express at each point for example a direction to be taken at that point, given as x and y coordinates, and the either general or possibly vehicle-specific allowed maximum speed. These data can be used for determining in which direction and at what speed the mining machine is allowed to move at that point. In addition, a gear precisely suitable for each mining machine, the position of a boom or lever arm possibly included in the machine, and the position of a bucket, if any, may be determined. These data naturally depend on the fixtures of the mining machine in question, so naturally they are not relevant to all mining machines.

Figure 3:
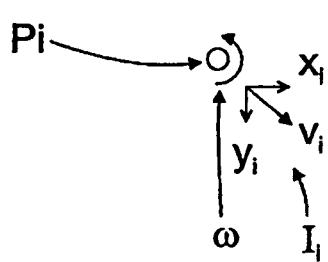
FIG. 3 is a schematic illustration of a route point in a route segment and data associated, by way of example, therewith.

FIG. 3 is a schematic illustration of one route point of a route segment and data associated, by way of example, therewith.

The Figure shows one route point Pi, given as an example, which may be either an end point of a segment or an intermediate segment point. Different data, some which are schematically shown, may be associated with point Pi. Ii represents schematically the information content of point Pi, showing the location of point Pi in a rectangular coordinate system. Location values are expressed as vectors or numeral values $x_i$ and $y_i$ on coordinate axes x and y. FIG. 3 further shows a turning angle ω, which expresses the angle of turn required to a specific direction to allow the mining machine to continue its travel. In addition to these data, information Ii relating to the point in question may show for example: the gear to be selected from the gear system of a particular mining machine of a particular type, such as gear 2 for a loader in the case illustrated by FIG. 3, the angle of inclination of a boom possibly belonging to the mining machine, such as a position of 30° or some other position for the boom of a loader bucket, or the position of the bucket attached to the boom, such as "horizontal" for a loader bucket, and any other data that have an impact on the movement of the mining machine and the guidance thereof via route point Pi to a particular direction.

According to an embodiment that is simpler than the one illustrated in FIG. 3, there is no speed or turning angle data as such associated with a point, but only the location coordinates of the point in a determined coordinate system. In this embodiment the control equipment of the mining machine calculates the driving directions and the turning angles according to the coordinates of successive route points so that the mining machine route runs according to the determined points, while, at the same time, the guidance or turning angles of the vehicle are suitably calculated between the points in accordance with the route curvature determined by calculation. In that case also turning in junctions is correspondingly calculated on the basis of the position data of the route points alone, using the software of the mining machine control equipment. To guarantee safety, data such as maximum allowed track curvature and/or maximum allowed speed and, in proportion to the latter, maximum allowed track curvature in different kinds of turning situations are stored in the memory of the mining machine. Further, a characteristic known as target speed may be determined for the movement of the mining machine to indicate the speed at which the machine is to move in different situations. Target speed may thus be determined in proportion to track curvature, for example.

Figure 4:
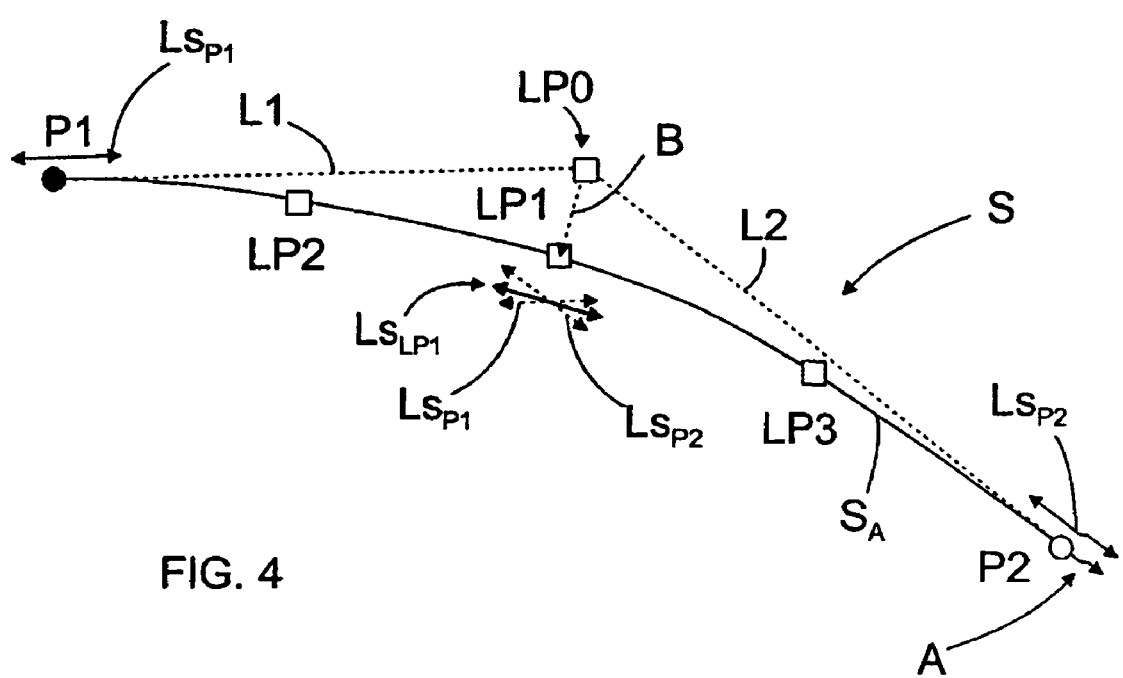
FIG. 4 schematically illustrates the generating of additional route points for a route segment and the data associated, by way of example, therewith in relation to one additional route point.

FIG. 4 schematically illustrates the generating of additional points for a route segment and the data associated, by way of example, therewith in relation to one additional route point. It shows segment S that has two route points P1 and P2 of known location and characteristics, additional route points LP1 to LP3 facilitating the guidance of the machine being determined between the route points. Route points P1 and P2 are shown as dots; P1 as a black dot, because it is the end point of segment S, and P2 as a white dot, because it is an internal route point of the segment. Additional points LP1 to LP3 are marked schematically with a rectangle so as to avoid confusion with the route points of FIGS. 2 and 3 determined earlier. The segment continues, by way of example, from point P2 in the direction shown by arrow A to the next known route point of segment S, which in a logical direction of propagation is point P3. FIG. 4 further illustrates a principle for determining additional points by taking into account the directions of known route points P1 and P2. These directions are used to illustrate, on one hand, how the location of an additional route point LP1 to LP3 as such is determined and, on the other hand, how parameters for an additional route point can be determined using known route points.

For purposes of illustration, and by way of example, first a direction of movement at additional point LP1 is determined on the basis of directions of movement $LS_{P1}$ and $LS_{P2}$ determined in relation to route points P1 and P2. Lines L1 and L2, shown with broken lines, conforming to the directions of movement and traversing points P1 and P2 intersect at point LP0, which determines the point where the mining machine, if it continued straight ahead according to the directions of movement, would enter the area of the next point. Since abrupt changes of this extent are in principle not possible to implement in a rational manner, the route in the segment is formed as a curved track formed almost asymptotically in relation to an angle formed by lines L1 and L2, the track being referred to as $S_A$. Thus the first additional point LP1 is shifted inwards as shown by arrow B and sets on line $S_A$. The determining of the parameters for additional point LP1 starts from the parameter values of points P1 and P2, which are used for determining the parameters of LP1.

FIG. 4 further shows, by way of example, the determining of the direction of movement at additional point LP1, carried out by using the directions of movement determined according to points P1 and P2. This is illustrated by the set of arrows below additional point LP1. Arrows $LS_{P1}$ and $LS_{P2}$, drawn with broken lines, show the directions of movement determined in relation to points P1 and P2. The direction of movement can be determined in relation to additional point LP1 by means of arrow $LS_{LP1}$, shown with a continuous line, which substantially bisects the angle formed by the above mentioned two arrows. This parameter expressing direction of movement provides an example of how parameters can be determined for additional points by using parameters determined in relation to known points. Consequently, speeds can be correspondingly determined using values and vectors of speed, and then other parameters can be determined between the parameter values of known points, or otherwise on the basis of them.

Additional points LP2 and LP3 are, in turn, determined with the help of additional point LP1. Additional point LP2 is determined using point P1 and additional point LP1 and, correspondingly, additional point LP3 by using point P2 and additional point LP1, in the same way as additional point LP1 was determined with points P1 and P2.

Figure 5:
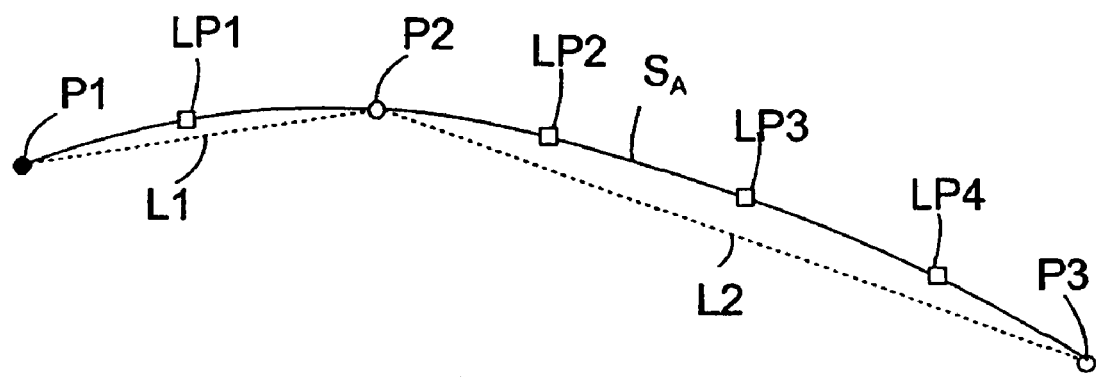
FIG. 5 schematically illustrates another way of generating additional route points for a route segment and the data associated, by way of example, therewith in relation to one additional route point.

FIG. 5 shows a situation where route points are determined using location coordinates alone, in which case the coordinates of successive points are used for calculating theoretical directions of movement between route points P1 and P2 and, correspondingly, between P2 and P3, the directions being expressed as straight lines L1 and L2 traversing successive points. Since an abrupt change of direction at a route point is not possible, the software provided in the mining machine control equipment calculates a curved track $S_A$ on the basis of the coordinates of at least three successive route points so that the mining vehicle travels conveniently on a substantially curved track along the route determined by the route points. When additional points LP1 to LP4 are determined on the basis of the data available and stored in the control equipment of the mining machine, the position of the points in the coordinate system is calculated with the software in the control equipment of the mining machine in question so that the points set suitably on the above convenient track $S_A$.

Figure 6:
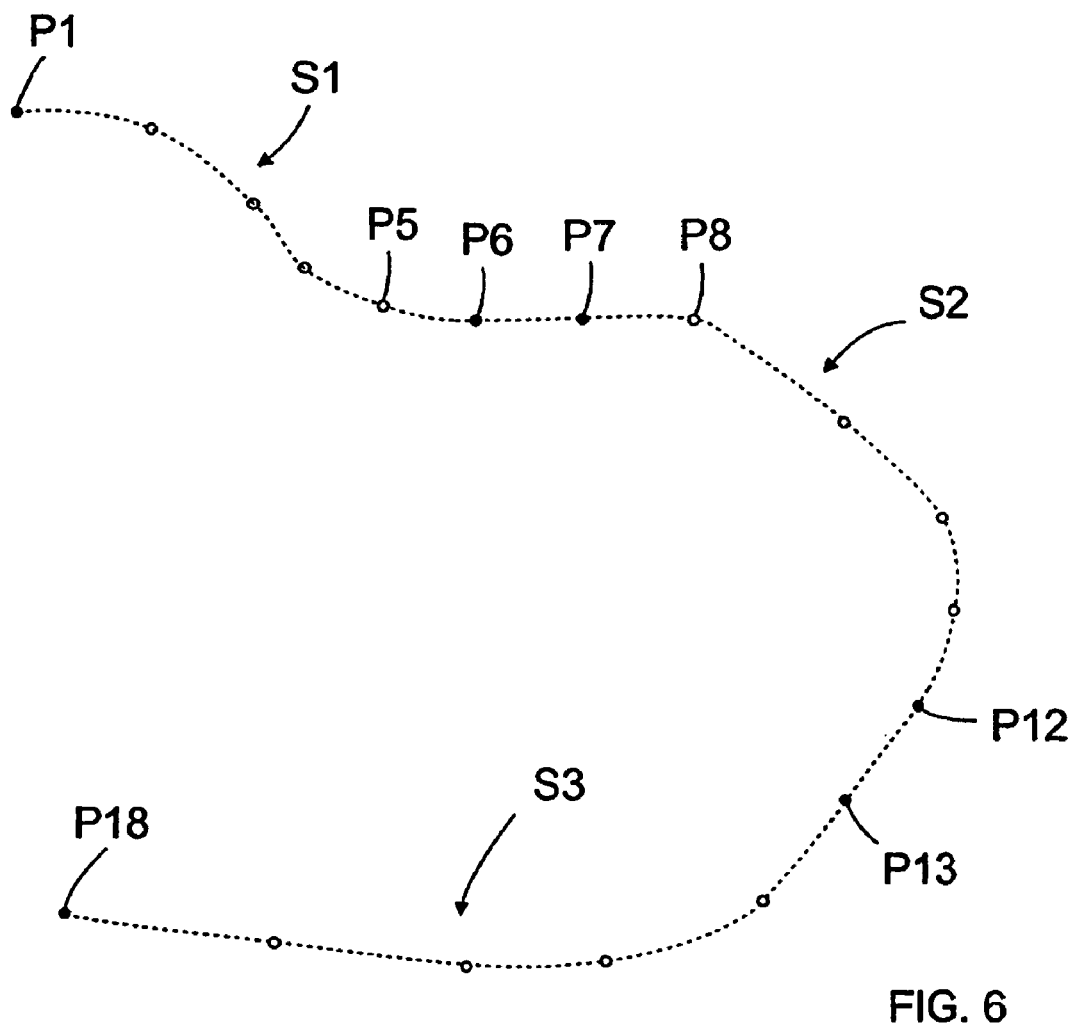
FIG. 6 is a schematic illustration of a route formed of successive segments.

FIG. 6 is a schematic illustration of a mining machine route formed of successive segments. Each segment comprises a set of points whose characteristics and parameters in relation to the operation of the mining machine have been determined. Successive segments may join each other at the end points thereof and thus have one common point. Therefore in some cases a plural number of segments may join each other at the same point, for example in different crossings, as shown in FIG. 1. FIG. 6 schematically illustrates three successive segments S1 to S3 formed by points P1 to P18, the segments together forming a uniform route. The situation shown in FIG. 6 represents a simple and preferred embodiment in which the distance between the end points of each segment is approximately equal to the distance from these end points to the closest route point in the same segment. Segment S1 is thus between points P1 and P6 and segment S2, in turn, between points P7 and P12. The distance between end points P6 and P7 is approximately of the same order as the distance from end points P6 and P7 to the nearest point in the same segment, i.e. the distance between points P5 and P6 and between points P7 and P8, respectively. Particularly in an embodiment in which the route points are determined using only location coordinates and the software of the mining machine control equipment determines the route by calculation, there is no need for common segment points, but the calculation can be carried out between the end points of a segment, just as in relation to any route points.

Figure 7:
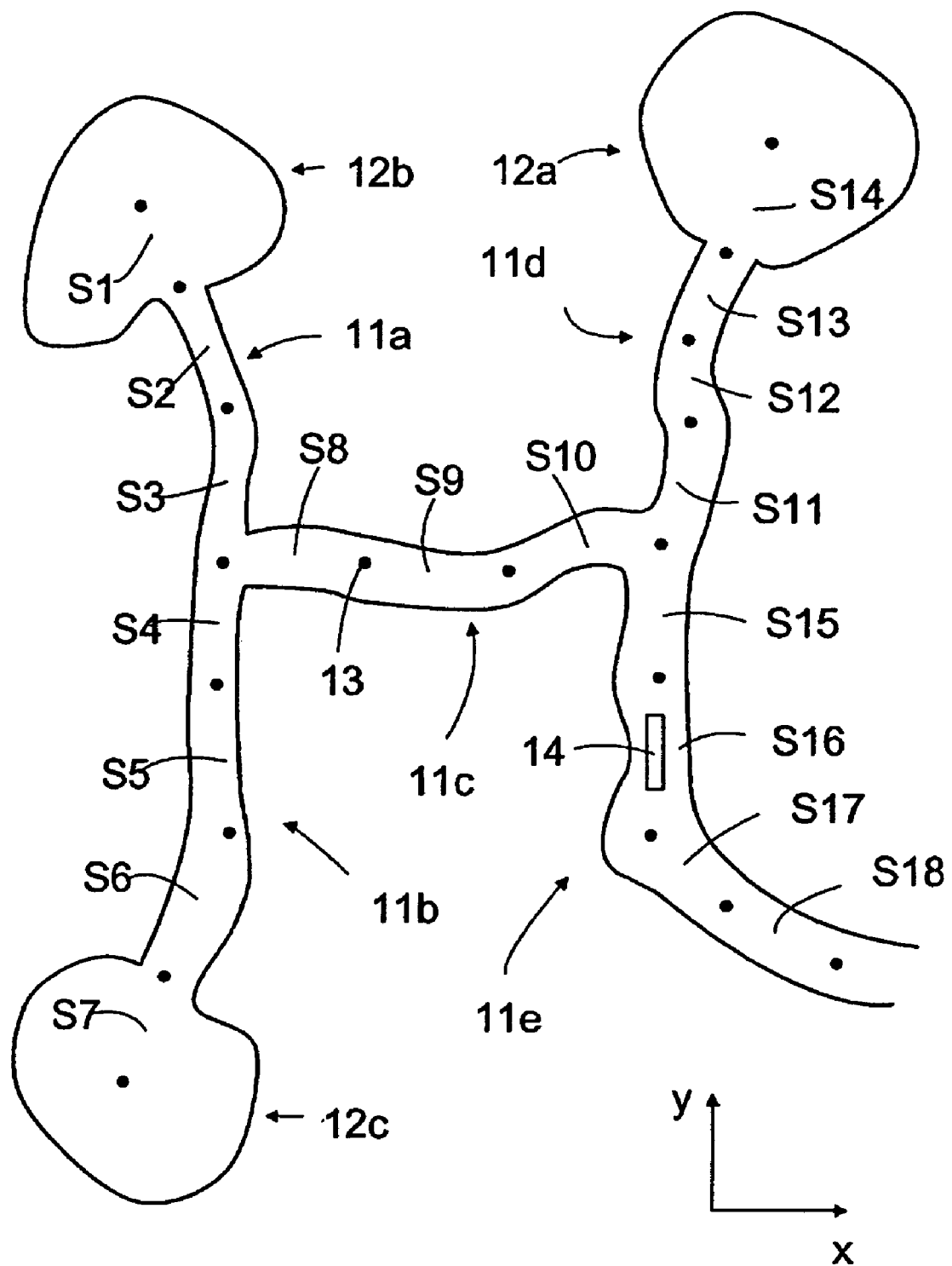
FIG. 7 is a schematic illustration of some mine passages, where the invention is applied.

FIG. 7 is a schematic illustration of part of a mine tunnel in which the method of the invention can be applied. It shows a mine tunnel 11 comprising a number of different sections 11a to 11e. At the end of some tunnel sections there is a loading or a discharge site 12a to 12c. The tunnel sections 11a to 11e are each provided with points 13 to schematically indicate the end point of segments Si. The Figure further shows a coordinate system of x and y coordinates fixedly determined in relation to the mine.

When located at the point shown in FIG. 7, the unmanned mining machine 14 automatically guided by the control system receives a command to move from its current location to the loading site 12a and to start transferring material from the loading site 12a to the discharge site 12b. In this situation the route assigned to the mining machine consists of segments S1 to S3 and S8 to S14. Further, segments S16 and S15 have been determined as connecting routes to allow the mining machine to move to the determined route to perform the assigned task.

In this situation the control unit of the mining machine 14 determines on the basis of its current location the nearest point in segment S16 and then begins to read points of segments S15 and S11 to S14 from that onwards into its memory, as shown in FIG. 1, until a route terminating at the loading point of the loading site 12a has been determined. When the first points have been determined, the mining machine 14 can begin to move towards the loading site 12a, while, at the same time, it continues to store in its control unit data on segments S1 to S3 and S8 to S10 of the route relating to its task. Since the data of segments S11 to S14 are already entered in the first step, they do not need to be entered again. When the mining machine 14, i.e. the loader used here as an example, has reached the loading site 12a, it fills its bucket according to the instructions it has received and follows its task route in a reverse order from S14 to S8 and from S3 to S1 to the discharge site 12b, where it discharges the load of the bucket and then travels the route in opposite direction to return to the loading site 12a. The control equipment of the mining machine may inform the accomplishment of the task to the control system of the mine, the machine being then provided with a new assignment and the associated data via the data transfer system. In some cases, when it is necessary to repeat a specific task a plural number of times, the mining machine may be instructed to carry out this task until it receives new instructions.

According to a most preferred embodiment, the data associated with the segments are stored in advance in the memory of the mining machine control system, the mining machine assigned with a task being then only provided with an assignment-specific list of the segments to be used, i.e. segment identifier numbers or codes and, when necessary, other operational instructions. On the basis of these data the software provided in the mining machine control equipment is capable of determining the route of the mining machine and its speed and turning angles at different points of the route. This is particularly efficient in a situation in which a wireless data transfer system of limited capacity is used, because the amount of data to be sent to the machine is significantly smaller than in a situation where the route point data are transmitted every time separately. However, when the task assigned to the mining machine requires the machine to move to a new area whose route points have not been stored in its memory, it is naturally necessary to transfer new segment-specific data to the mining machine and to store them in the control equipment memory as they arrive and thus later it is again only the segment identifier code that needs to be informed. Similarly, when a new mining machine is introduced into a mine, necessary data on segments and their route points can be entered into the memory of its control equipment either by transferring the data on discs or on other portable storage media or by transferring them wirelessly into the memory of the mining machine control equipment when the mining machine is within the coverage area of the wireless data transfer network of the mine.

When moving along its route, the mining machine must always know its location precisely. For this purpose, it is provided with positioning means that continuously measure its location. Such positioning means may include different distance gauges, devices measuring travel direction and/or steering angle, different equipment for scanning the environment to determine location on the basis of data, such as a wall profile, obtained by the scanning. All these data serve for checking that the mining machine is where it should be in order to be able to operate and move according to the determined segments.

Figure 8:
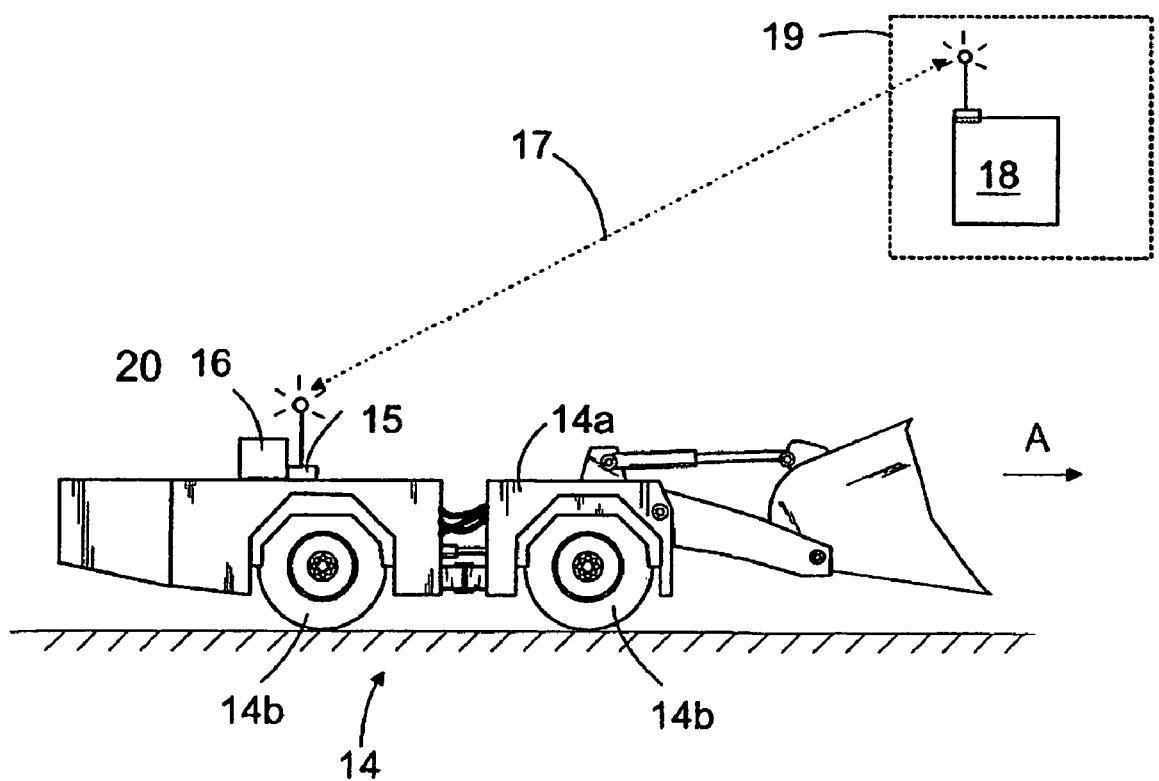
FIG. 8 is a schematic illustration of equipment for implementing the invention.

FIG. 8 shows a mining machine 14, a loader in this case, provided with a bucket at its front part for carrying and loading excavated material. Alternatively, the mining machine 14 may be a rock drilling rig or a transport vehicle provided with a platform, for example. The mining machine 14 comprises a movable carrier 14a, which is usually provided with a number of wheels 14b on which it moves. Such mining machines are commonly known per se and therefore they need not be described in greater detail here. In addition,this type of mining machine 14 that preferably operates wit is provided with a control system including at least a control unit 15, which is arranged to control the actuators of the mining machine 14 for steering and operating the vehicle. Further, the mining machine 14 has a data transfer unit 19 with which the control unit 15 may set up a data transfer connection 17 to control equipment 18 external to the mining machine 14.The control equipment 18 forms a part of an overall control system 19 of the mine used for guiding unmanned, automatically moving mining vehicles 14. The control unit 15, the control equipment 18, and the control system 19 of the mine usually contain also computers or similar devices. In addition, the control system of the mining machine 14 contains other measuring and control devices 20 allowing the direction and location of the vehicle to be determined for precise positioning. Further, the control system comprises means for determining the distance travelled by the mining machine 14. Such means for determining location and distance are also commonly known per se and therefore they do not need to be described in greater detail here.

The drawings and the related specification are only meant to illustrate the inventive idea. The details of the invention may vary within the scope of the claims.

The invention claimed is:

1. A method for automatically guiding a mining machine, comprising:
   determining a route needed by a mining machine as successive points in a coordinate system fixed in relation to the mine;
   determining a location of the mining machine on the route using at least one positioning device provided in the mining machine;
   wherein on the basis of information relating to the route points already determined in the coordinate system, additional points are determined between the successive route points for guiding the mining machine, each additional point being provided at least with location coordinates determined on the basis of the coordinate values of the already determined points located on both sides of the additional point to be determined.

2. The method according to claim 1, wherein at least one parameter having an impact on the guidance of the mining machine is determined for each route point and that on the basis of the already determined parameter data, corresponding parameter data are determined for each additional point.

3. The method according to claim 1, wherein the information relating to the route points is transmitted preferably wirelessly from the control system of the mine to the control equipment of the mining machine, the mining machine control equipment then determining a necessary number of additional points, with the required parameters, and guided the mining machine to travel on the predetermined route according to the determined route points and additional route points.

4. The method according to claim 3, wherein the mining machine control equipment determines a necessary number of additional points, with the required parameters, on the basis of the data stored in its memory on the coordinates and parameters of the route in question.

5. The method according to claim 1, wherein the route is determined as interconnected successive segments stored in the memory of the control system of the mine, that each segment is determined as successive route points located at a distance from one another, and that the mining machine control equipment guides the machine to travel on the route determined with the segments.

6. The method according to claim 5, wherein the route points of the segments and at least their coordinates are stored in advance in the memory of the mining machine control equipment and that the route is determined by supplying only the identifiers of the route segments to the mining machine.

7. The method according to claim 1, wherein each point is provided with information determining the direction of movement possible at that point and at least one other value of a parameter determining the operation of the mining machine.

8. The method according to claim 7, wherein one parameter determining the operation of the mining machine is the maximum allowed speed and that the control equipment of the mining machine determines the speed of the machine on the basis of a target speed set for the machine, taking into account the speed values of each route point or additional route point.

* * * * *